July 16, 1929.　　　A. I. MARCUM　　　1,720,796
FRAME CONSTRUCTION
Filed June 26, 1926
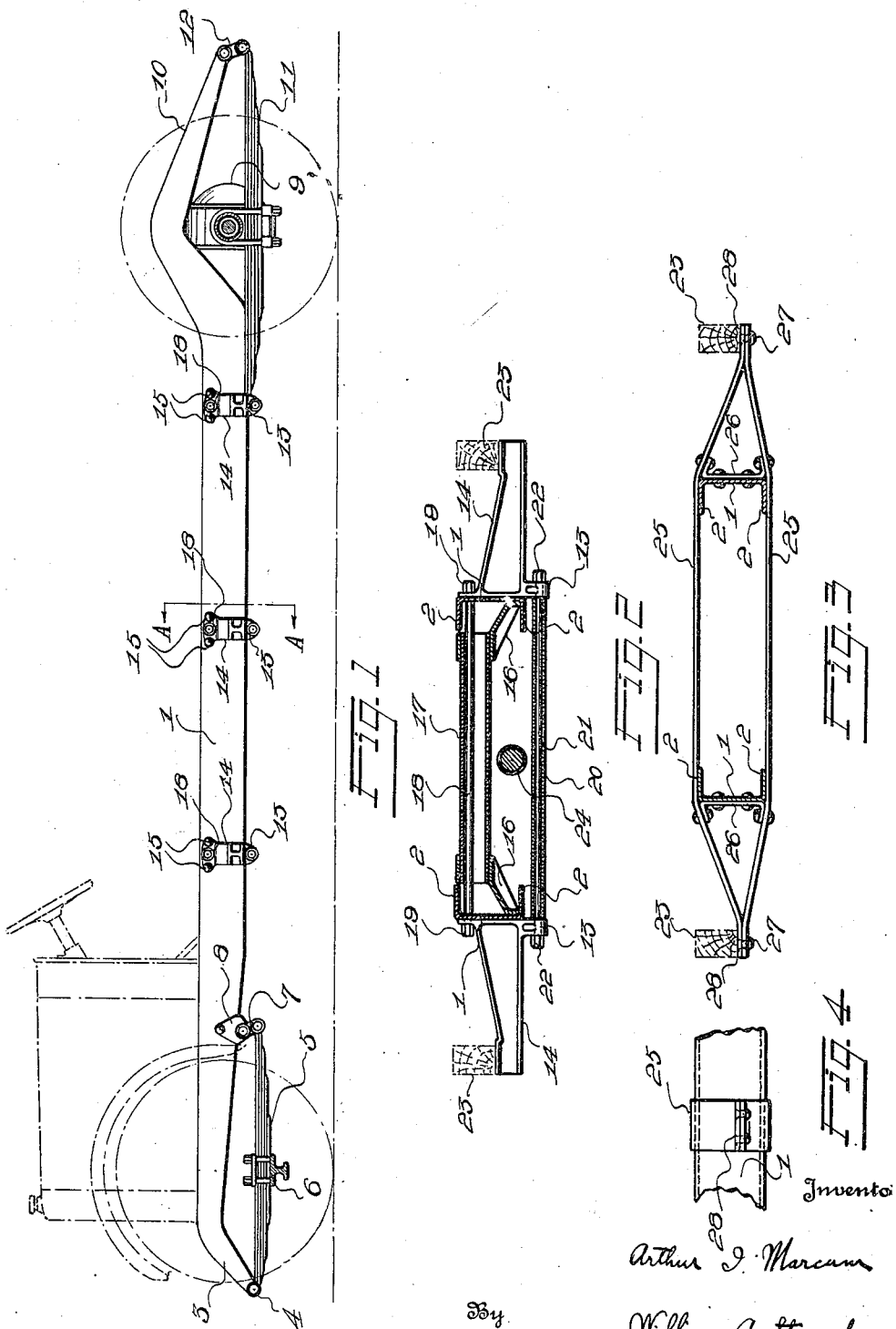

Patented July 16, 1929.

1,720,796

UNITED STATES PATENT OFFICE.

ARTHUR I. MARCUM, OF OAKLAND, CALIFORNIA, ASSIGNOR TO EMORY WINSHIP, OF MACON, GEORGIA.

FRAME CONSTRUCTION.

Application filed June 26, 1926. Serial No. 118,653.

The present invention relates to improved frame constructions for vehicles.

More particularly the invention relates to improved frame constructions for automobiles and road vehicles designed to operate at relatively high speeds and to carry heavy loads. In vehicles of this character it is desirable to support the body as low as possible and to provide long bodies and relatively long wheel bases which results in greatly increased frame stresses. In the prior frame constructions it has been the practice to rivet body supporting brackets to the frame side members in a manner depending on the rivet strength to support the body weight and causing a tendency for the weight of the body to twist the frame side members. To construct a frame for road vehicles in accordance with prior practice necessitates the use of heavy frame constructions which add unnecessarily to the weight of the vehicle and reduce the load carrying capacity of the vehicle.

Accordingly an object of the present invention is to provide a light weight rigid frame construction especially adapted for use in heavy duty high speed road vehicles.

A further object of the invention is to provide a frame and body supporting construction in which the tendency of the weight on the body supporting brackets to twist the frame side members is substantially eliminated so that size and weight of frame members and the cost of construction of the frame construction is substantially reduced.

Further objects of the invention are to provide a frame construction of minimum weight and cost and maximum rigidity in which the stress on the bracket securing rivets is relieved; to provide a frame cross member and body supporting construction which does not depend entirely upon rivet strength; and to form a unitary cross member and body support which relieves the frame side members of twisting stresses.

Other objects of the invention will appear in the following detailed description of the preferred embodiments thereof and are such as may be attained by a utilization of the various combinations and sub-combinations as defined by the terms of the appended claims.

As shown in the drawings:

Figure 1 is a side elevation partially in diagram of a preferred form of the invention.

Figure 2 is a sectional view taken along line A—A of Figure 1.

Figure 3 is a sectional view of a modified form of the invention.

Figure 4 is a fragmental end view of the form of invention shown in Figure 3.

Referring to Figures 1 and 2, 1 represents the frame side members which are preferably channel shaped in section with their flanges 2 turned inward. The side members 1 at their forward ends are inclined downwardly and pivotally secured thereto by pins 4 are the forward ends of leaf springs 5. Leaf springs 5 are supported intermediate their ends on the axles 6 and are connected at their rear end by means of the shackles 7 to suitable brackets 8, which in turn are secured to the frame side members 1 by rivets or in any other suitable manner. At their rear ends the side members 1 are provided with a kick-up over the rear axle 9 of the vehicle and after passing over the rear axle 9 the side members 1 incline downwardly in a section 10 to which the rear end of the leaf springs 11 are connected by means of the shackles 12 in well known manner. Leaf springs 11 are supported intermediate their ends from the axle 9 and are pivotally connected at their forward ends by means of suitable securing brackets to the side members 1 of the frame. As shown in the drawings springs 11 are connected to downward extensions 13 of the rear one of the body supporting brackets 14. A plurality of the body supporting brackets 14 are secured by means of the rivets 15 to the frame side members 1. To provide for inter-tying the frame side members 1, a cross member structure comprising end castings 16 which are shaped to nest between the flanges 2 of the side members 1 are located in alignment with the brackets 14. Castings 16 may be secured in position by means of the rivets 15 if desired. Rigidly secured to and connecting the castings 16 are tubular spacing members 17. Tension rods 18 provided with threaded ends upon which nuts 19 are screwed extend through the brackets 14, frame side members 1, and spacing members 17 and tie the frame side members and body brackets together. Positioned between the extensions 13 of the brackets 14 are the tubular spacing members 20. Securing rods 21 pass through extensions 13 and spacing members 20 and are threaded on their ends and provided with nuts 22 by means of which extensions 13 of brackets 14 are drawn tightly against the spacing members 20. Supported on the brackets 14 are the body sills 23. In this way a frame structure is provided in which the tendency of the body weight to twist the side members is resisted by compression of the spacing member 20 and tension of the rods 18. It will be observed that the twisting forces of the left hand sill tend to twist its bracket in counter-clockwise direction viewing Figures 2 or 3, and that the right hand sill tends to rotate its bracket in a clock-wise direction. By directly connecting these brackets these twisting forces tend to counter-balance each other. Furthermore, with this construction the propeller shaft 24 from the engine to the drive axle may be positioned between the tubular members 17 and 20 so that in case of breakage of the universal joints or the shaft, the broken shaft sections will be supported and prevented from dropping to the ground.

In the form of invention shown in Figures 3 and 4 a member construction is provided in which the frame members are riveted together. In this form of the invention metal straps 25 are passed over the flanges 2 of the side members 1 and are riveted to the securing members 26 which in turn are riveted to the outside of the frame side members 1. At their outer ends the members 25 are secured together by means of the rivets 27 and shaped to form the supporting ledges 28 for the body sills 23. In this form of the invention the tendency for the frame side members to twist under the weight of the body is relieved by tension in the upper metallic strap 25 and by compression in the lower cross member 25, and the torsional forces tend to counter-balance each other as in the form shown in Figure 2.

Having described preferred embodiments of the invention it will be apparent to those skilled in the art that wide variations may be made without departing from the spirit of my invention.

Accordingly what is desired to be secured by Letters Patent and claimed as new is:

1. A motor vehicle frame construction comprising spaced longitudinally extending side members, body sill brackets secured thereto, parallel tie rods extending between said brackets and spanning the space between said members, spacing sleeves surrounding said tie rods certain of which space said brackets independently of said members and means to tension said rods.

2. A road vehicle frame construction comprising a plurality of spaced longitudinally extending channel shaped side members arranged with their channels facing each other, brackets arranged in each channel, transverse members connected to said brackets, lengthwise adjustable tie members extending through said side members, brackets and transverse members, longitudinally extending body sills spaced a substantial distance laterally of said side members and brackets to support said body sills, said brackets being tied to said side members by said tie members and being directly tied together by lengthwise adjustable rods arranged adjacent the lower edges of said side members.

3. The combination defined in claim 2 in which the body sill securing brackets on opposite sides of the vehicle are held in definitely spaced relation by spacing sleeves and include a tie rod traversing said sleeve and clamping said brackets against the ends thereof.

4. A motor vehicle frame construction including spaced longitudinally extending side members, longitudinally extending body sills spaced a substantial distance laterally of said members, brackets abutting their ends against and secured to the sides of said side members supporting said sills and a pair of transverse members separate from said brackets but rigidly secured thereto and extending across said side members adjacent the top and bottom edges thereof so as to form with said side members a closed loop whereby the forces tending to twist said side members are substantially resisted by said transverse members, portions of said side members being bent upwardly to receive a driven axle substantially within the planes between which the unbent portions of said side members normally lie, whereby the propeller shaft for said driven axle may pass between said transverse members.

5. A motor vehicle frame construction including spaced longitudinally extending side members, longitudinally extending body sills spaced a substantial distance laterally of said side members, brackets bearing against a substantial portion of the side members and extending in opposite directions away from said side members and supporting said body sills, said brackets being formed so that the tops of the body sills are approximately in horizontal alinement with the top surfaces of said side members, and transverse members separate from said brackets secured to alined brackets on opposite sides of said side members adjacent the upper and lower portions of said side members and connecting said alined brackets together and to said side members.

In testimony whereof I affix my signature.

ARTHUR I. MARCUM.